(No Model.)
S. L. DENNEY.
CAR AXLE.
No. 366,307. Patented July 12, 1887.
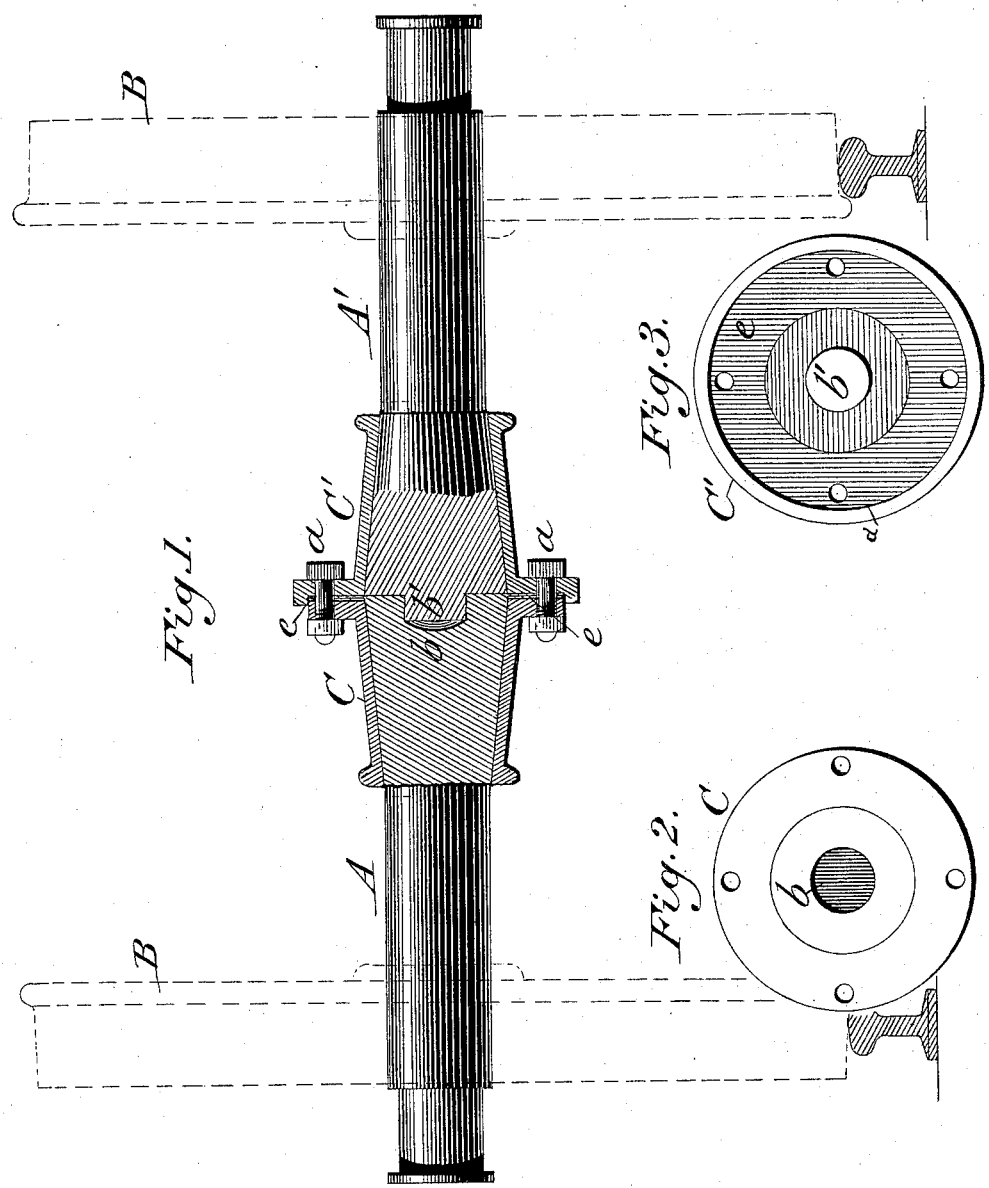

UNITED STATES PATENT OFFICE.

SAMUEL L. DENNEY, OF LANCASTER, PENNSYLVANIA, ASSIGNOR OF ONE-HALF TO HARRY B. COCHRAN, OF SAME PLACE.

CAR-AXLE.

SPECIFICATION forming part of Letters Patent No. 366,307, dated July 12, 1887.

Application filed April 29, 1887. Serial No. 236,561. (No model.)

*To all whom it may concern:*

Be it known that I, SAMUEL L. DENNEY, a citizen of the United States, residing at Lancaster, in the county of Lancaster and State of Pennsylvania, have invented certain new and useful Improvements in Car-Axles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in that class of car-axles commonly known as "divided axles," these axles being intended to allow a different rate of speed to the wheels attached thereto, so that it will not be necessary for either wheel to slip in passing curves, as the speed of each wheel adjusts itself automatically to the length of track over which it runs, thus avoiding the danger of derailment in passing curves and the great loss of power caused by the necessity of compelling one of the two wheels attached to each axle to slide, as it does when the axle is solid and the wheels firmly secured thereto, owing to the difference in length between the inner and outer rail on all railway-curves. Another advantage gained by the use of the divided axle consists in the prevention of the change which occurs in the structure of the metal composing the solid axle, which, owing to the torsional strains caused by turning curves, becomes granular and weak and finally breaks. The divided axle also relieves the wheels of much strain and wear from friction in sliding on the rails, thereby enabling them to remain serviceable much longer than the same wheels would if attached to solid axles. Many ways have been heretofore devised for accomplishing this result, among which may be named that of securing one wheel upon the axle by collars placed upon each side of it, so as to allow the wheel to turn upon the axle between them. Another plan has been to form the axle in two parts, one of which was bored out with a long straight or else tapering hole, the other part of the axle having an extension turned to fit said hole. This last-named method of construction was too costly, as it entailed a great waste of material as well as much labor in its fitting. Still another method of producing the axle consists in cutting it in two and then uniting the parts by a sleeve slipped over the joint and fastened to one of the parts, the other part of the axle being allowed to turn loosely within said sleeve. All of these plans, so far as my knowledge extends, have proved so defective that they have not generally been adopted, although the great need of such a device is evident.

The object of my invention is, therefore, to so construct the parts of the axle and the coupling by which these parts are united as to produce a cheap and practical device which may go into common use upon cars used on railways having curves of a short radius—such as are now common in mountainous regions; and the invention consists, essentially, in enlarging the connected ends of the two parts of an axle and forming such enlarged part into a tapering frustum of a cone, with its base at the end of each part tapering as it extends toward the wheel until it becomes of the same diameter as the body of the axle. Two flanged coupling-pieces having a tapering bore are then slipped one over each part of the axle and brought together over the enlarged ends, and there firmly bolted to each other, as will be hereinafter fully described, and then specifically pointed out in the claims.

In the accompanying drawings, which represent this invention, and in which similar letters of reference indicate like parts in the different figures, Figure 1 is a front view of an axle embodying my invention, the central part being in section to show the construction of the joint. Figs. 2 and 3 are perspective views of the two parts of the coupling which connect the separate parts of the axle at the joint.

In the figures, A and A' represent the axle, B B the wheels, and C C' the coupling by which the two parts of the axle are united. The two parts A and A' are each enlarged at one end to form a frustum of a cone, with its base at the inner end, so that when the parts are brought together they will present the appearance of a double cone united at the base.

A recess, *b*, is bored in the enlarged end of part A and forms a receptacle for oil, as well as a bearing for the center-pin *b'*, projecting from the enlarged end of the part A'. In order to retain these two parts A and A' in position after the bases of the cones are brought together and the pin $b'$ has entered the recess $b$, I slip over each part of the axle one of the two flanged sleeve-couplings C and C'. Each of these couplings is bored out to fit the conical surface of the end of one part of the axle, and is provided with registering-holes, through which the bolts $a\ a$ pass that secure said parts C C' firmly together. The flange of the part C' of the coupling is recessed at $d$ to receive the flange of the part C, which is of less diameter than the other and fits snugly into said recess, so that when the two parts of the coupling are brought together and secured by the bolts through the flanges the sleeves of said parts will embrace the conical portions of both parts of the axle, holding them firmly in position, but allowing either to turn independently of the other within the sleeve of the coupling.

In order to take up lost motion that may accrue from wear of the conical portions of the axle and couplings, I provide a series of washers, $e\ e$, which are inserted between the flanges of the coupling and one or more of them removed whenever it is desired to tighten the joint, as the removal of a washer draws the sleeve farther upon the conical ends of the two parts of the axle, and causes the parts to be again brought into close contiguity, making a firm joint and restoring the alignment of the axle, the whole forming a strong, reliable, and cheaply-constructed axle, in the use of which the wheels attached thereto have a perfectly free rotation independently of each other.

Having thus described my invention, I claim as new, and desire to secure by Letters Patent, the following:

1. As an improvement in car-axles, an axle divided near its mid-length, each end of the adjoining parts being enlarged to form the frustum of two cones with their bases contiguous to each other, in combination with a sleeve-coupling having its sleeves bored conically to fit the cones of the axles, the flanges of said coupling being bolted together to retain the two parts of the axle in their proper relative positions, substantially as shown and described.

2. In a car-axle, the two conically-ended parts A and A'; the part A having a recess, $b$, and the part A' a pin, $b'$, to enter said recess, in combination with the flanged coupling C C', the bolts $a\ a$, for securing the parts of said coupling together, and the washers $e\ e$ interposed between the flanges, all arranged to allow each part of the axle to rotate independently of the other part, substantially as and for the purpose set forth.

In testimony whereof I affix my signature in presence of two witnesses.

SAMUEL L. DENNEY.

Witnesses:
  M. A. BALLINGER,
  HARRY B. COCHRAN.